United States Patent Office 3,320,298
Patented May 16, 1967

3,320,298
METHYL S-ISOPROPYL 2,3,5,6-TETRAHALO-MONOTHIOTEREPHTHALATES
Sidney B. Richter, Chicago, and Alfred A. Levin, Skokie, Ill., assignors to Velsicol Chemical Corporation, Chicago, Ill., a corporation of Illinois
No Drawing. Filed May 13, 1964, Ser. No. 367,224
5 Claims. (Cl. 260—455)

This invention relates to the production of new pesticidal compositions of matter. More specifically, this invention relates to new chemical compounds of the formula:

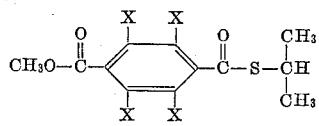

wherein X is halogen. While the halogen can be fluorine, chlorine, bromine, or iodine, the preferred halogen is chlorine. These new compounds have been found to be useful as pesticides, particularly as herbicides.

The compounds of this invention can be prepared from the appropriate tetrahaloterephthaloyl chloride. For example, compounds wherein X is chlorine can be obtained from the known compound 2,3,5,6-tetrachloroterephthaloyl chloride as a starting material. The group

—C(O)—S—CH—(CH$_3$)$_2$ can be introduced by treating each molar proportion of the tetrachloroterephthaloyl chloride with a molar proportion of the mercaptan HS—CH—(CH$_3$)$_2$. Ordinarily, it is preferred to use the mercaptan in the form of one of its alkali metal salts for convenience in handling. Sodium isopropyl mercaptan is a good reagent for this reaction.

Once the group —C(O)—S—CH—(CH$_3$)$_2$ has been introduced into the molecule of the intermediates for the compounds of this invention, the —C(O)—O—CH$_3$ group can be introduced readily. For example, the intermediate already containing the C—(O)—S—CH—(CH$_3$)$_2$ group but still having one —C(O)—Cl group can be subjected to alcoholysis with methanol.

The reactions discussed above are ordinarily carried out in the presence of suitable inert solvents. The temperatures at which the reactions can be carried out are not critical. Generally, temperatures of from about normal room temperature to about the normal reflux temperature of the reaction mixture are preferred. While the reactions are normally carried out at atmospheric pressure, sub- or superatmospheric pressures can also be used. The crude reaction products containing the new compounds of this invention are often pure enough for pesticidal use as such; but compounds can be purified, if desired, by any of the recognized techniques known to the art, such as fractional distillation, crystallization from suitable solvents, or chromatography.

The manner in which new compounds of this invention can be prepared is illustrated in the following examples, in which all temperatures are in degrees centigrade.

Example 1.—Preparation of S-isopropyl ester of 4-thiocarboxy-2,3,5,6-tetrachlorobenzoyl chloride An aqueous solution (66 g.) of the sodium salt of isopropyl mercaptan (0.16 mole) was added with rapid stirring to a solution of 2,3,5,6-tetrachloroterephthaloyl chloride (30 g.; 0.08 mole) in 100 ml. of dioxane in a 250 ml., round bottom, 3-necked flask fitted with a mechanical stirrer and reflux condenser. The mixture was stirred overnight at room temperature, filtered through magnesium sulfate, and allowed to stand. The solvent was then stripped in vacuo to give an oil. The oil was the desired ester, S-isopropyl ester of 4-thiocarboxy-2,3,5,6-tetrachlorobenzoyl chloride.

Example 2.—Preparation of methyl S-isopropyl 2,3,5,6-tetrachloromonothioterephthalate The S-isopropyl ester of 4-thiocarboxy-2,3,5,6-tetrachlorobenzoyl chloride was allowed to stand and solidify. The solid was then dissolved in methanol, heated at reflux for several hours, and the solution was cooled. The solid which precipitated was filtered off and dried. The solid was recrystallized from heptane and dried to give methyl-S - isopropyl 2,3,5,6 - tetrachloromonothioterephthalate, M.P. 117–19°.

The following are some typical examples of other tetrahaloterephthaloyl chlorides which can be used as starting materials in the manner described in Examples 1 and 2:

Example 3.—2,3,5,6-tetrabromoterephthaloyl chloride.
Example 4.—2,3,5,6-tetrafluoroterephthaloyl chloride.
Example 5.—2,3,5,6-tetraiodoterephthaloyl chloride.

When the above tetrahaloterephthaloyl chlorides are used as starting materials in Examples 1 and 2, the following compounds useful in the method of control of this invention are obtained, in respective order:

Example 6.—Methyl - S - isopropyl - 2,3,5,6-tetrabromomonoterephthalate.
Example 7.—Methyl - S - isopropyl - 2,3,5,6-tetrafluoromonoterephthalate.
Example 8.—Methyl - S - isopropyl 2,3,5,6-tetraiodomonoterephthalate.

For practical use as herbicides, the compounds of this invention are generally incorporated into herbicidal compositions which comprise an inert carrier and a herbicidally toxic amount of such a compound. Such herbicidal compositions, which are usually known in the art as formulations, enable the active compound to be applied conveniently to the site of the weed infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the weed infestation. The emulsifiers most commonly used in these concentrates are nonionic or mixtures of nonionic with anionic surface-active agents.

A typical herbicidal composition according to this invention is illustrated by the following example, in which the quantities are in parts by weight.

Example 9.—Preparation of a dust

Methyl S-isopropyl - 2,3,5,6 - tetrachloromonothioterephthalate _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The herbicides of this invention can be applied in any manner recognized by the art. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lambsquarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal toxicity of the new compounds of this invention can be illustrated by many of the established testing techniques known to the art. For example, soil samples seeded with various weeds were sprayed within 24 hours with aqueous emulsions of the test compounds. After the sprays were applied to the soil, the containers were maintained under greenhouse conditions for 15-20 days. The plants were then observed for injury, and the degree injury was rated as follows: 0=no injury; 1,2= slight injury; 3,4=moderate injury; 5,6=moderately severe injury; 7,8,9=severe injury; 10=death. In these experiments, the product, methyl S-isopropyl-2,3,5,6-tetrachloromonothioterephthalate, at the rate of only 2 lbs./acre, caused injury rated at 9 on crabgrass, foxtail and wild oats. This latter weed is especially troublesome in the cultivation of wheat, and therefore it is particularly significant that the subject compound was completely nontoxic to wheat at dosages as high as 8 lbs./acre.

Similarly, post-emergence tests were carried out by spraying the test compounds on the foliage of weeds which had attained a prescribed size. The sprayed plants were maintained under greenhouse conditions for 13 days, after which the degree of injury was rated on the same scale as described above. In these tests, the compound methyl S-isopropyl-2,3,5,6-tetrachloromonothioterephthalate caused injury rated at 9 on barnyard grass and 8 on crabgrass when used at a rate equivalent to 8 lbs./acre.

We claim:
1. A compound of the general formula:

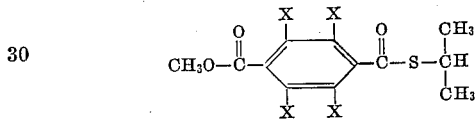

wherein X is halogen.

2. Methyl S-isopropyl 2,3,5,6-tetrachloromonothioterephthalate.

3. Methyl S-isopropyl 2,3,5,6-tetrabromomonothioterephthalate.

4. Methyl S-isopropyl 2,3,5,6-tetrafluoromonothioterephthalate.

5. Methyl S-isopropyl 2,3,5,6-tetraiodomonothioterephthalate.

References Cited by the Examiner
UNITED STATES PATENTS

| | | | |
|---|---|---|---|
| 2,396,487 | 3/1946 | Blake | 260—455 |
| 2,396,513 | 3/1946 | Jones | 71—2.6 |
| 2,826,600 | 3/1958 | Driver | 260—455 |
| 2,893,855 | 7/1959 | Smith | 71—2.6 |

FOREIGN PATENTS

| | | |
|---|---|---|
| 1,265,053 | 8/1960 | France. |

CHARLES B. PARKER, *Primary Examiner.*

JAMES O. THOMAS, Jr., *Examiner.*

A. J. ADAMCIK, *Assistant Examiner.*